UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

COLORING-MATTER.

SPECIFICATION forming part of Reissued Letters Patent No. 11,077, dated May 20, 1890.

Original No. 412,613, dated October 8, 1889. Application for reissue filed February 6, 1890. Serial No. 339,495. Patented in Germany August 18, 1888, No. 3,757; in Belgium September 3, 1888, No. 83,115; in England September 4, 1888, No. 12,796; in France September 5, 1888, No. 192,807; in Italy September 30, 1888, XLVII, 176; in Spain December 7, 1888, No. 8,673, and in Austria-Hungary February 27, 1889, No. 36,484 and No. 56,586.

*To all whom it may concern:*

Be it known that I, ALBERT HERRMANN, a citizen of the Empire of Germany, residing at Höchst-on-the-Main, in the Empire of Germany, have invented certain new and useful Improvements in Coloring-Matters, (the same having been patented in France September 5, 1888, No. 192,807; in Germany August 18, 1888, No. 3,757; in England September 4, 1888, No. 12,796; in Spain December 7, 1888, No. 8,673; in Austria-Hungary February 27, 1889, No. 36,484 and No. 56,586; in Belgium September 3, 1888, No. 83,115, and in Italy September 30, 1888, No. 176, Vol. 47;) and I do hereby declare the following to be a full, clear, and exact description of the invention, such as will enable others skilled in the art to which it appertains to make and use the same.

My invention relates to the production of green-blue coloring-matter to be considered as derivative of the metaoxydiamidotriphenyl methane $$CH\begin{cases} C_6H_4OH(_3) \\ C_6H_4NH_2 \\ C_6H_4NH_2 \end{cases}$$

The leuco base of this coloring-matter is produced by condensing metanitrobenzaldehyde with tertiary aromatic amines (*Berichte der deutschen chemischen Gesellschaft*, 12,802,) reducing and converting the amido bases into the corresponding oxy compounds by means of nitrous acid, or by condensing directly the metaoxybenzaldehyde with tertiary aromatic amines. From the leuco base thus obtained the corresponding coloring-matter is produced by oxidation by means of superoxides or similar agents.

The sulphonic acid of the coloring-matter is produced by sulphonating the leuco-bases mentioned and oxidizing the leuco sulphonic acids, or by the direct action of sulphuric acid on the coloring-matter. These sulphonic acids excel the various sorts of "acid green" offered in the trade by their special resistance to the influence of light, and also by their special fastness in washing.

I. PRODUCTION OF METAOXYTETRALKYLDIAMIDOTRIPHENYL METHANE.

*A. Conversion of meta-amidotetralkyldiamidotriphenyl methane into the corresponding metaoxytetralkyldiamidotriphenyl methane by means of nitrous acid.*—The following is given as an example of carrying out the conversion: Fifty parts, by weight, of meta-amidotetraethyldiamidotriphenyl methane are dissolved in thirty-five parts, by weight, of hydrochloric acid (of thirty-three per cent.) and five thousand parts, by weight, of water. The solution is cooled down to 0° centigrade, and while it is kept well stirred there is slowly added a cold solution of 8.9 parts, by weight, of nitrite, (of 96.5 per cent.) The solution of the hydrochlorate of metadiazotetraethyldiamidotriphenyl methane is heated slowly and kept at 60° centigrade for some time, until the liberation of nitrogen has become rather feeble. It is then boiled until the liberation of nitrogen ceases. To the acid solution is added a soda-lye until it shows a slight alkaline reaction. By these means the metaoxy leuco base is precipitated in the form of a crystalline powder. It is filtered off, boiled with water, and afterward dried. In a similar manner is carried out the production of the other metaoxytetralkyldiamidotriphenyl methanes, (obtained from the meta-amido leuco bases,) which, like the ethyl compound mentioned before, have relatively strong basic qualities—viz., of metaoxytetramethyldiamidotriphenyl methane, symmetric metaoxydimethyldiethyldiamidotriphenyl methane $$CH\begin{matrix} C_6H_4OH \\ [C_6H_4N(CH_3)(C_2H_5)]_2, \end{matrix}$$

unsymmetric metaoxydimethyldiethyldiamidotriphenyl methane $$CH\begin{cases} C_6H_4OH \\ C_6H_4N(CH_3)_2, \\ C_6H_4N(C_2H_5)_2 \end{cases}$$

metaoxytetramethyldiamidodiorthotolylphenyl methane, and metaoxytetraethyldiamidodiorthotolylphenyl methane.

The process of the production of the metaoxy leuco bases showing slighter basic qualities—such as, for example, metaoxydibenzyldiethyldiamidotriphenyl methane $$CH\left\langle\begin{array}{l}C_6H_4OH\\ C_6H_4N(C_2H_5)(C_7H_7)-\\ C_6H_4N(C_2H_5)(C_7H_7)\end{array}\right.$$

is slightly different from the process just described. It is as follows: Thirty-five parts, by weight, of meta-amidodibenzyldiethyldiamidotriphenyl methane $$CH\left\{\begin{array}{l}C_6H_4NH_2\\ [C_6H_4N(C_2H_5)(C_7H_7)]_2\end{array}\right.$$

are dissolved in thirty parts, by weight, of concentrated sulphuric acid and about four thousand parts, by weight, of water. The solution is cooled down to 0° centigrade, and then there is added slowly a cold solution of 4.7 parts, by weight, of nitrite (of 96.6 per cent.) The decomposition of the diazo compound thus obtained by boiling with water is carried out as described above. Of the metaoxy leuco bases thus formed the greatest part precipitates in crystalline form, and what of it remains in solution is precipitated from the liquid by the addition of sulphate of sodium. The oxy leuco base precipitated forms a crystalline powder, which, in order to free it from the accompanying acid, &c., is boiled with water until it shows neutral reaction. In a similar manner are prepared metaoxydibenzyldimethyldiamidotriphenyl methane, metaoxydimethyldiphenyldiamidotriphenyl methane, and metaoxydiethyldiphenyldiamidotriphenyl methane.

*B. Production of metaoxytetralkyldiamidotriphenyl methane by condensing metaoxybenzaldehyde with tertiary aromatic bases.*—The production of the tetraethyl compound, for example, may be carried out in the following manner: Twenty parts, by weight, of diethylaniline, eight parts, by weight, of concentrated sulphuric acid, and nine parts, by weight, of metaoxybenzaldehyde are heated in a lead-lined boiler furnished with an agitator to 130° centigrade for three to twenty-four hours. The mass resulting is supersaturated with soda-lye, and the excess of diethylaniline expelled by a current of steam. The oxy leuco base remaining is repeatedly boiled with water and afterward dried. In a similar manner are obtained by this process the leuco bases mentioned above, if for the diethylaniline is substituted dimethylaniline, methylethylaniline, ethylbenzylaniline, methylbenzylaniline, dimethyl - orthotoluidine, diethyl - orthotoluidine, methyl-diphenylamine, or ethyl-diphenylamine.

The metaoxytetralkyldiamidotriphenyl methanes produced according to the processes described are in pure state colorless crystalline compounds; but it is rather difficult to obtain them quite colorless, as by the contact of the atmosphere they soon become colored.

The bases dissolve quite easily in ether, benzol, and toluol, not so easily in alcohol, and are insoluble in water.

The oxy compounds do not dissolve in diluted alkalies.

II. PRODUCTION OF THE SULPHONIC ACID OF METAOXYTETRALKYLDIAMIDOTRIPHENYL METHANE.

The metahydroxylized leuco bases of the generic formula $$CH\left\{\begin{array}{l}C_6H_4OH\\ [C_6H_4N(Alk)_2]_2\end{array}\right.$$

may be converted into sulphonic acids by being heated with concentrated sulphuric acid; but, principally in consideration of the purity of the product to be obtained, it is more advantageous to use fuming sulphuric acid instead of the ordinary acid. The process is as follows:

*Example No.* 1.—Thirty parts, by weight, of metaoxytetraethyldiamidotriphenyl methane are dissolved in one hundred and fifty parts, by weight, of fuming sulphuric acid of ten per cent. $SO_3$, and the solution left standing at ordinary temperature until a sample gives with diluted ammonia a clear solution. Now the product of the reaction is poured into water and the solution converted into the calcium salt in well-known manner. The calcium salt is a powder very easily soluble in alcohol and in water. In the same manner is carried out the production of the sulphonic acids, respectively, of their calcium salts of metaoxytetramethyldiamidotriphenyl methane, symmetric metaoxydimethyldiethyldiamidotriphenyl methane, unsymmetric metaoxydimethyldiethyldiamidotriphenyl methane, metaoxytetramethyldiamidodiorthotolylphenyl methane, and metaoxytetraethyldiamidodiorthotolylphenyl methane.

*Example No.* 2.—Somewhat different is the process for the preparation of the sulphonic acids of those leuco bases which in the amido group still contain aromatic residues, (capable of being sulphonated) such as benzyl or phenyl. The compounds belonging to this class are the following: metaoxydibenzyldiethyldiamidotriphenyl methane, metaoxydibenzyldimethyldiamidotriphenyl methane, metaoxydiphenyldiethyldiamidotriphenyl methane, and metaoxydiphenyldimethyldiamidotriphenyl methane.

In the following example is described the way in which is carried out the sulphonation of the leuco bases: Thirty parts, by weight, of metaoxydibenzyldiethyldiamidotriphenyl methane are dissolved in one hundred and fifty parts, by weight, of fuming sulphuric acid of twenty per cent. $SO_3$. At ordinary temperature is formed a sulphonic acid scarcely soluble in water. Then the solution is heated for several hours to about 70° centigrade, until a sample dissolves easily in water with blue color and gives with diluted ammonia a pure blue solution having the shade of a diluted ammoniacal solution of oxide of copper. Now the product of the reaction is poured into water and converted into the calcium salt in a manner well known.

III.—OXIDATION OF THE LEUCO-SULPHONIC ACID.

From the calcium salts of the leuco-sulphonic acids mentioned in II is prepared, by oxidation with superoxides or similar agents in presence of the calculated quantity of mineral acids, the corresponding coloring-matter. For example, ten parts, by weight, of the calcium salt of the sulphonic acid prepared from metaoxytetraethyldiamidotriphenyl methane are dissolved in about three hundred parts, by weight, of water. Then are added the calculated quantities of diluted sulphuric acid and superoxide of lead filtered off from the precipitated sulphate of lead, and the blue solution of the coloring-matter is evaporated to dryness.

The new coloring-matter is in the form of a coppered powder of metallic luster, dissolving quite easily in water, giving blue color. The aqueous solution turns green on the addition of an excess of mineral acid. The blue color of the aqueous solution does not disappear on the addition of soda-lye when cold, not even when it is boiled with a solution of ammonia or soda, and it turns violet only when it is boiled with soda-lye. The characteristic quality of the new coloring-matter—namely, the great resistance to the action of alkalies—is a great advantage for technical purposes and constitutes a great merit of the invention. These compounds dye wool and silk in an acid bath a green-blue shade and excel in dyeing an even tint, in which respect the sulphonic acids of indigo are equaled.

In consequence of the resistance to alkalies the tints produced are (compared to those produced with "indigo carmine") very fast in washing.

IV.—CONVERSION OF METAOXYTETRALKYLDIAMIDOTRIPHENYL CARBINOL INTO THE ACID COLORING-MATTER DESCRIBED IN SUB. III.

The same coloring-matter may be obtained also by sulphonating metaoxytetralkyldiamidotriphenyl carbinol. This compound is formed by treatment of the leuco bases described in sub. I with superoxides or similar agents, and is a yellow-green coloring-matter, the salts of which excel by their great aptitude to crystallize. The sulphates of chlorhydrates of this carbinol, $$\left[HOC\begin{cases}C_6H_4OH(\text{meta})\\C_6H_4NAlk_2\\C_6H_4NAlk_2\end{cases}\right]-$$

viz., of metaoxytetramethyldiamidotriphenyl carbinol, metaoxytetraethyldiamidotriphenyl carbinol, symmetric metaoxydimethyldiethyldiamidotriphenyl carbinol, unsymmetric metaoxydimethyldiethyldiamidotriphenyl carbinol, metaoxytetramethyldiamidodiorthotolylphenyl carbinol, and metaoxytetraethyldiamidodiorthotolylphenyl carbinol—may be converted by treatment with sulphuric acid into acid coloring-matter identical with the coloring-matter described in III.

The conversion is, for example, carried out in the following way: Ten parts, by weight, of metaoxytetraethyldiamidotriphenyl carbinol are dissolved in sixty parts, by weight, of "monohydrate" and the solution heated to 50° to 60° centigrade, until a sample dissolves in diluted ammonia with a blue color. The product of the reaction is then converted into the calcium or sodium salt in manner well known.

What I claim as new, and desire to secure by Letters Patent, is—

1. As a new article, blue-green coloring-matter, the sulphonic acid of metaoxytetralkyldiamidotriphenyl carbinol, a copper-red powder with metallic luster, dissolving in water with blue color, dyeing wool and silk blue-green tints, and prepared according to the process described, or by any other process giving similar results.

2. The process of making blue-green dyestuff, as herein described, which consists in dissolving meta-amidotetralkyldiamidotriphenyl methane in a mineral acid, diazotizing by nitrous acid or nitrite in the usual way, decomposing the diazo compound by boiling with water, precipitating by the addition of soda or sulphate, boiling the resulting oxy leuco base with water until it becomes neutral, sulphonating the same by heating with concentrated or fuming sulphuric acid, and oxidizing the sulphonic acid with peroxide of lead or similar agents, as set forth.

In testimony whereof I set my hand in the presence of two witnesses.

ALBERT HERRMANN.

Witnesses:
JOSEF REVERDY,
HEINRICH HAHN.